US005474403A

United States Patent [19]

Hetrich

[11] Patent Number: 5,474,403

[45] Date of Patent: Dec. 12, 1995

[54] MOUNTING DEVICE

[75] Inventor: A. Ronald Hetrich, Manheim, Pa.

[73] Assignee: Fenner, Inc., Manheim, Pa.

[21] Appl. No.: 221,177

[22] Filed: Mar. 31, 1994

[51] Int. Cl.[6] .................... F16B 2/14

[52] U.S. Cl. .................... 403/369; 403/370; 403/371

[58] Field of Search .................... 403/369, 370, 403/371, 368, 13–14, 365, 367, 12; 279/42, 47, 48, 52, 56

[56] References Cited

U.S. PATENT DOCUMENTS

| | | | |
|---|---|---|---|
| 4,202,644 | 5/1980 | Soussloff . | |
| 4,345,851 | 8/1982 | Soussloff | 403/369 |
| 4,364,687 | 12/1982 | Adell | 403/370 |
| 4,367,053 | 1/1983 | Stratienko et al. | 403/371 |
| 4,543,704 | 10/1985 | Soussloff . | |
| 4,600,334 | 7/1986 | Soussloff | 403/369 |
| 4,615,640 | 10/1986 | Hosokawa | 403/369 |
| 4,824,281 | 4/1989 | Katsube | 403/370 X |
| 5,009,539 | 4/1991 | Muellenberg | 403/370 |
| 5,374,135 | 12/1994 | Folsom et al. | 403/369 |

OTHER PUBLICATIONS

E T N Power Transmission Systems, "QD Hubs and Adapters", A1–A1–4.

*Primary Examiner*—Kenneth J. Dorner
*Assistant Examiner*—Harry C. Kim
*Attorney, Agent, or Firm*—Dann, Dorfman, Herrell and Skillman; Henry H. Skillman

[57] ABSTRACT

A mounting device for anchoring a machine element having a tapered bore coaxially upon a rotary shaft. The device fits between the interior tapered bore of the machine element and the cylindrical surface of the shaft and is effective to position the element at any desired position longitudinally of the shaft and at any angular position circumferentially of the shaft. The device has inner and outer segmented sleeves, the mating surfaces of which are similarly tapered so that relative axial displacement of the sleeves effects expansion and contraction of the interior bore and external surface of the combined elements. Rotation of an internally threaded nut at one end of the device effects the relative axial displacement of the inner and outer sleeves to afford expansion and contraction of the outer sleeve without straining the material of the sleeve or the nut. The external surface of the outer sleeve is tapered for mating with the tapered bore of the machine element and has an abutment flange to maintain the machine element at a fixed, axial position during and after mounting of the machine element upon the shaft.

16 Claims, 1 Drawing Sheet

11 45 50 43 23 38 22 36 29 13 14 27a 12 21 41 27 31 42 23 22

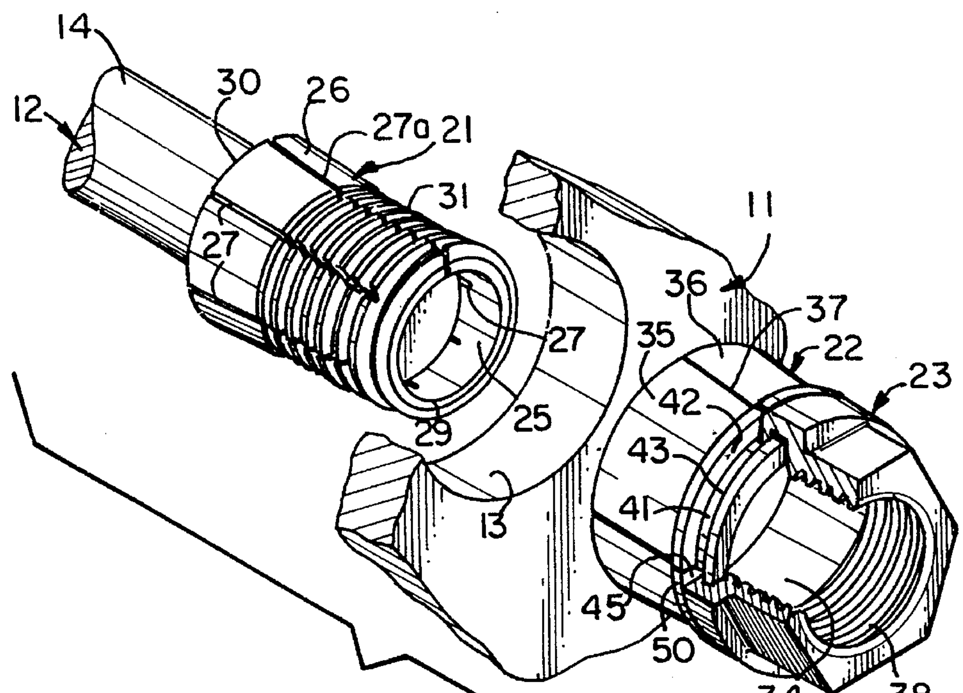
FIG. 1
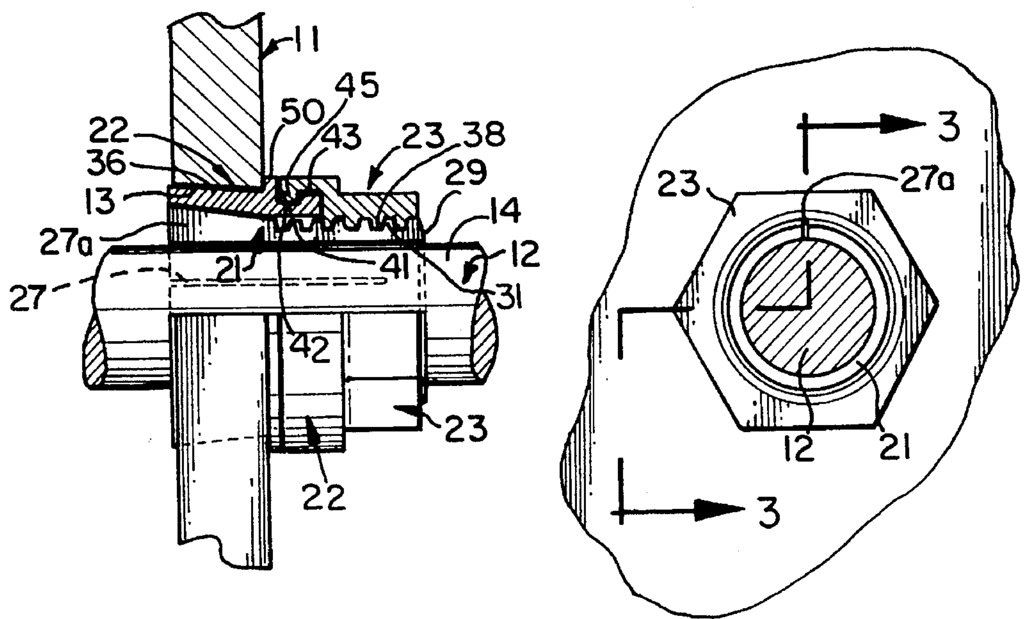
FIG. 3
FIG. 2

MOUNTING DEVICE

FIELD OF THE INVENTION

The present invention relates to a mounting device for mounting a machine element upon a shaft in such a manner that the rotation of the shaft transmits its entire torque to the machine element without slippage due to the mounting. In particular, the device of the present invention provides an improved mounting device for mounting machine elements having tapered bores, thereby permitting infinitely-variable adjustment of the machine element on the shaft, both axially of the shaft and circumferentially thereof, and maintaining the machine element at a fixed, axial position after mounting on the shaft.

BACKGROUND OF THE INVENTION

The use of devices for mounting machine elements, such as pulleys and gears, upon a shaft is well-known.

One difficulty is that the known devices for mounting a machine element having a tapered bore upon a cylindrical shaft are cumbersome to use. For example, some devices require assembly of multiple pieces and adjustment of several screws, and other devices require modification of the shaft on which the machine element is mounted.

Another difficulty frequently encountered relates to the need for precise positioning of the machine elements at a fixed, axial position on the shaft when the machine element is mounted upon the shaft. This difficulty occurs when the mounting device is tightened and from a tendency of the machine element to slide axially along the tapered mounting surface due to the tapered bore of the machine element.

SUMMARY OF THE INVENTION

In accordance with the present invention, a mounting device is provided that is easy to use. The device enables the mounting of a machine element by simply tightening a single nut to effect frictional engagement and also to ensure disengagement by loosening the same nut. The nut operates to positively release the frictional engagement produced by tightening the nut. Furthermore, the design of the present unit is of simple construction and is relatively inexpensive to manufacture.

The present invention also solves the difficulty of maintaining the machine element at a fixed position. Once mounted, the device retains the machine element at a fixed, axial position relative to the shaft.

A device for coaxially mounting a machine element having a tapered bore upon a cylindrical shaft includes an inner sleeve for encircling the cylindrical shaft. The inner sleeve has a tapered external surface and an interior bore corresponding in diameter to the cylindrical shaft. The inner sleeve includes an axial slot extending longitudinally along the inner sleeve to permit contraction of the interior bore of the inner sleeve. The inner sleeve also has external threads at one end of the sleeve.

An outer sleeve for encircling the inner sleeve includes a tapered internal surface corresponding in angle of taper to the tapered external surface of the inner sleeve. A tapered external surface of the outer sleeve corresponds to the tapered bore of the machine element. An abutment limits the movement of the machine element to a fixed limit position during mounting of the machine element upon the shaft. An axial slot extends longitudinally along the outer sleeve to permit expansion of the tapered external surface of the outer sleeve.

A nut having interior threads engages the external threads of the inner sleeve and has a circumferential forward drive surface such that upon rotation, the nut effects axial displacement of the inner sleeve in one direction relative to the nut. The forward drive surface of the nut engages the outer sleeve and effects axial displacement of the outer sleeve in an opposite direction relative to the inner sleeve. The relative displacement of the inner and outer sleeves causes the interior bore of the inner sleeve to contract against the cylindrical shaft and the tapered external surface of the outer sleeve to expand against the tapered bore of the machine element, thereby effecting coaxial mounting of the machine element on the cylindrical shaft.

BRIEF DESCRIPTION OF THE DRAWINGS

The foregoing summary, as well as the following detailed description of the preferred embodiments of the present invention, will be better understood when read in conjunction with the appended drawings, in which:

FIG. 1 is a fragmentary exploded perspective view of a mounting device, in accordance with the present invention, in position for coupling a machine element to a shaft;

FIG. 2 is an end view of the assembled mounting device as seen from the righthand end of FIG. 1; and FIG. 3 is a transverse sectional view taken on the irregular section line 3—3 of FIG. 2.

DETAILED DESCRIPTION OF THE PREFERRED EMBODIMENT

With reference to the embodiment of the mounting device shown in FIG. 1, the mounting device is designed to mount the hub of a machine element 11 upon a cylindrical shaft 12. In the present instance, the machine element 11 has a smooth tapered bore 13 (see FIGS. 1 and 3) whose axis coincides with the axis of the cylindrical surface 14 of the shaft 12. The mounting device is designed to be positioned between the bore 13 and the surface 14 and to be expanded therein to securely anchor the element 11 on the shaft 12 at any desired position axially of the shaft and in the illustrated embodiment at any angular position circumferentially of the shaft.

The mounting device incorporates an inner segmented sleeve 21, an outer segmented sleeve 22, and a locking nut 23. The inner sleeve 21 is tubular in form having an internal cylindrical bore 25 whose diameter corresponds to the diameter of the surface 14, the bore 25 being of sufficiently greater diameter than the surface 14 to permit free sliding movement of the sleeve 21 on the shaft 12 both axially and circumferentially. The sleeve 21 is formed into a plurality of segments 26 by means of slots 27 which extend axially longitudinally of the sleeve from the lefthand end 30 in FIGS. 1 and 3. All but the slot *27a* terminate along a line spaced inwardly from the other end 29. The termination of the slots 27, in conjunction with the through-slot *27a*, provides a split ring portion at the righthand end 29 of the sleeve 21. The axial length of the split ring at 29 is sufficient to maintain the integrity of the sleeve 21 when the segments 26 are deflected radially inward or outward at the opposite end 30 of the sleeve. The split ring portion avoids complex stress which might otherwise cause fatigue of the inner sleeve 21 in repeated uses. As shown, the end 29 of the sleeve 21 is externally threaded as indicated at 31, the threads extending from the righthand end 29 along the length of the split segments 26 formed by the slots 27 and terminate short of the free ends of the segments at the lefthand end 30. The free ends of the segments 26 have tapered external surfaces to cooperate with the outer sleeve 22 as described below.

The inner sleeve 21 is adapted to fit within the outer sleeve 22 and the outer sleeve 22 comprises three separate segments 36 formed by axial slots 37 which extend longitudinally through the entire length of the outer sleeve 22. In the present instance, the slots 37 are three in number to provide segments 36, each of which embraces approximately one-third of the circumference of the inner sleeve 21. Axial slots 37 permit radial movement of the separate segments 36, which allows precise centering of the machine element 11 relative to the shaft 12. The outer surface 35 of the three segments combine to provide a tapered surface corresponding to the taper of the bore 13 and the segments have an internal surface 34 which has a tapered configuration, the taper of which corresponds to the taper of the external surface of the segments 26. In the illustrated embodiment the surfaces are frustoconical and have the same angle of taper. The width of the slots 37 is sufficient to permit contraction of the segments 36 to fit within the bore 13 prior to tightening engagement of the inner sleeve 21 with the outer sleeve 22. When the outer sleeve 22 is displaced on the inner sleeve 21 against the respective tapers, the tapered surfaces of the inner and outer sleeves cooperate to expand the external tapered surface of the outer sleeve 22 and contract the internal cylindrical surface of the inner sleeve 21, the contraction and expansion of the surfaces being substantially parallel to the common central axis of the assembly. The split ring portion 29 permits the inward contraction of the segments 26 under the stress applied by the tapered internal surface 34 of the segments 36.

An abutment means is included to maintain the machine element at a fixed position relative to the outer element both during and after mounting of the machine element on the shaft. As shown in FIG. 1, a flange 50 is provided on the outer sleeve 23 proximate to the slot 41 cooperates with the tapered surface 35 to provide a seat or saddle for precisely locating the machine element relative to the outer sleeve 23. Consequently, after the machine element is mounted to the shaft, the outer sleeve and the machine element, which abuts the flange of the outer sleeve, are located in a fixed position relative to the shaft. The outer surface 35 of the outer sleeve 22 is tapered so that the diameter of the outer surface 35 is smaller at the flange 50. The angle of the taper of the outer surface 35 is selected to conform to the angle of taper of the bore 13. When the machine element 11 is mounted on the shaft 12, the tendency is for the machine element to move in the direction of the smaller taper diameter, toward the flange 50, which operates as an abutment to prevent further axial movement of the machine element. Although the location of the abutment flange 50 is shown proximate the slot 41, other locations for the flange 50, along the outer surface 35 of the outer sleeve 22, are possible. Furthermore, other variations of an abutment, for example, in the form of a separate component, may be provided.

The outer sleeve 22 is displaced relative to the sleeve 21 by means of the nut 23. To this end, the nut 23 has internal threads 38 which threadedly engage the threads 31 of the inner sleeve 21. Rotating the nut 23 on the inner sleeve 21 axially displaces the nut relative to the inner sleeve.

In accordance with the invention, the nut 23 is interlocked with the outer sleeve 22 so as to permit the segments 36 of the outer sleeve to slide up and down the inclined outer surface of the segments 26. Sliding up the surface locks the mounting device both against the shaft and against the tapered bore of the element. Sliding down the surface unlocks the mounting device. To this end, the outer sleeve 22 is provided with a circumferential groove 41 on its outer surface, the forward and rearward sidewalls 42 and 43, respectively, of the groove 41 being substantially perpendicular to the common axis of the assembly. Cooperating with the groove 41, a flange 45 having a width slightly less than the width of the groove 41 is provided on the internal surface of the nut 23, the forward and rearward surfaces of the flange 45 confront the forward and rearward surfaces 42 and 43 so as to operate as oppositely-directed drive surfaces effecting forceful axial movement of the outer sleeve 22 as the nut is threadedly displaced on the inner sleeve 21. The interlock provided by the groove 41 and the flange 45 enables the outer sleeve segments 36 to be displaced without strain or distortion of the material composing the segments 36.

In operation, it should be noted that the mounting device is forcefully engaged between the tapered bore 13 of the element 11 on one hand and the surface 14 of the shaft 12 on the other hand by tightening the nut 23 to displace the inner and outer sleeves relative to one another upwardly against the taper of the confronting surfaces of the segments 26 and 36. This displacement tends to contract the interior bore of the inner sleeve 21 and to expand the exterior surface of the outer sleeve 22. Likewise, the unit may be forcefully disengaged from between the element 11 and the shaft 12 by reverse rotation of the nut 23 so as to forcefully displace the outer sleeve 22 downwardly on the inner sleeve 21 in the direction of the taper of the confronting surfaces thereof. This displacement permits contraction of the exterior surface of the outer sleeve 22 and also permits expansion of the interior bore of the inner sleeve 21. The forceful displacement of the outer sleeve relative to the inner sleeve is accomplished by the drive surfaces consisting of the sides of the flange 45 and the sides of the groove 41. As shown in FIG. 3, during the loosening operation, the drive surfaces 43 forcefully engage one another to displace the sleeve 22 on the sleeve 21.

The angle of taper of the external surfaces of the segments 26 and the external surfaces of the segments 36 is selected relative to the length of the threaded portion 31 of the inner sleeve 21. A more shallow angle permits greater displacement of the outer sleeve 22 relative to the inner sleeve 21 without expansion of the mounting device. Alternatively, a sharper angle limits the relative displacement of the sleeves before expansion of the device. The selected taper angle of the external surfaces becomes important when mounting the machine element to the shaft. In particular, it is desirable to permit the machine element to pass over the free ends of the segments 26 and onto the outer sleeve 22 while the device is assembled. The appropriate taper angle affords contraction of the outer sleeve sufficient to enable the larger end of the outer sleeve 22 to pass through the small end of the tapered bore of the machine element. For example, in a device for mounting a machine element having tapered bore of ¾ inch/ft of length on a nominal ¾ inch shaft, it has been found that the inner sleeve preferably has a thread length of ¾ inch and a tapered external surface with a taper angle of approximately 6 degrees. These dimensions permit the larger end of the segmented outer sleeve to contract from 1⅜ inch O.D. to 1¼ inch O.D. as a nut is threaded from one end of the threads to the other.

If it is necessary to disassemble the unit, after unthreading the nut 23 from the threaded portion 31 of the inner sleeve 21, the outer sleeve 22 may be disengaged from interlocking relationship with the nut 23 by displacement of the individual segments 36 inwardly to disengage the groove 41 from the flange 45. However, when the nut 23 is engaged with the threads 31 of the inner sleeve 21, the inner sleeve will prevent the inward displacement of the segments 36. The flange 45 engages in the groove 41, surrounds the segments 36 to capture them, and the mounting is thereby retained in properly assembled relationship and may be handled as a unit, as it is slipped onto the shaft 12 and positioned properly to receive the machine element 11. This particular arrangement enables the mounting device to be retained in assembled condition so that it is not necessary to match up different elements in preparing the assembly for use.

As an alternative, the groove 41 may face inwardly and the flange 45 may face outwardly, in which case a separate component, such as a circular spring wire circlet may be provided to surround the segments and capture them to retain them in assembled relation as a unit.

The present invention is particularly effective to avoid damage to the shaft and the machine elements in case of catastrophic overload of the machine. A major advantage of the construction of the invention is that it slips and protects other elements of the machine without damage to the shaft or the machine element. In the event slippage due to excess loading, the unit itself is not damaged and may be used without replacement or readjustment. The construction also enables the units to be fabricated from materials other than metal where the operating conditions are such as to limit the selection of the material used in fabricating the parts.

The use of a single nut circumscribing the shaft as the sole drive element for both tightening and releasing the mounting unit provides an efficient utilization of tightening torques, as it has been found that a tightening torque of only about 1000 inch-pounds on the nut is sufficient to provide a connection between a one-inch shaft and a machine element which will transmit a torque of approximately 3,000 inch-pounds at any practical speed. To disassemble the device, it has been found that only about 500 inch-pounds are necessary to disengage the mounting unit. This highly efficient torque ratio enhances the practical ability to install and remove the device.

It will be recognized by those skilled in the art that changes or modifications can be made to the above-described embodiments without department from the broad inventive concept of the invention. It should therefore be understood that this invention is not limited to the particular embodiments described herein but is intended to include all changes and modifications that are within the scope and spirit of the invention as set forth in the following claims.

I claim:

1. A device for coaxially mounting a machine element having a tapered bore upon a cylindrical shaft comprising:

(a) an inner sleeve for encircling the cylindrical shaft, the inner sleeve having a tapered external surface and an interior bore corresponding in diameter to the cylindrical shaft, the inner sleeve having an axial slot extending longitudinally along the inner sleeve to permit contraction of the interior bore, the inner sleeve also having external threads at one end of the inner sleeve;

(b) an outer sleeve for encircling the inner sleeve having a tapered internal surface corresponding in angle of taper to the tapered external surface of the inner sleeve and a tapered external surface corresponding to the tapered bore of the machine element, abutment means on said outer sleeve for engaging the machine element and positioning the same at a fixed axial position relative to the outer sleeve, the outer sleeve having an axial slot extending longitudinally along the outer sleeve to permit radial expansion of the tapered external surface of the outer sleeve while it is in said fixed axial position; and (c) a nut having interior threads and a circumferential forward drive surface such that upon rotation of the nut the interior threads of the nut engage with the external threads of the inner sleeve effecting axial displacement of the inner sleeve in one direction relative to the nut and the forward drive surface of the nut engages with the outer sleeve effecting axial displacement of the outer sleeve in an opposite direction, the displacements causing the interior bore of the inner sleeve to contract against the cylindrical shaft and the tapered cylindrical surface of the outer sleeve to expand against the tapered bore of the machine element.

2. The device according to claim 1 wherein the axial slot of the inner sleeve extends from one end of the inner sleeve longitudinally along the inner sleeve to permit contraction of the interior bore.

3. The device according to claim 1 wherein the axial slot of the inner sleeve extends from one end to the other end of the inner sleeve longitudinally along the full length of the inner sleeve to permit contraction of the interior bore.

4. The device according to claim 3 wherein the inner sleeve comprises a plurality of segments, providing a plurality of terminated axial slots extending longitudinally from one end of the inner sleeve and terminating short of the other end.

5. The device according to claim 1 wherein the angle of the taper of the external surface of the inner sleeve is equal to the angle of taper of the internal surface of the outer sleeve and is selected relative to the length of the threaded portion of the inner sleeve to afford contraction of the outer sleeve sufficient to enable the larger end of the outer sleeve to pass through the small end of the tapered bore of the machine element.

6. The device according to claim 1 wherein the abutment means is located at one end of the outer sleeve and cooperates with the tapered external surface of the outer sleeve to provide a seat or saddle for the machine element.

7. The device according to claim 1 wherein the abutment means comprise a circumferential external flange located at the small end of the tapered external surface of the outer sleeve.

8. A device for coaxially mounting a machine element having a tapered bore upon a shaft comprising:

(a) an inner sleeve for encircling the shaft, the inner sleeve having a tapered external surface and an interior bore corresponding in dimensions to the shaft, the inner sleeve having a plurality of segments for providing a plurality of terminated axial slots extending longitudinally from one end and terminating short of the other end of the inner sleeve and an axial slot extending longitudinally from one end to the other end of the inner sleeve to permit contraction of the interior bore, the inner sleeve also having external threads at one end of the inner sleeve;

(b) an outer sleeve for encircling the inner sleeve comprising a plurality of segments, the outer sleeve having a tapered internal surface corresponding in angle of taper to the tapered external surface of the inner sleeve and a tapered external surface corresponding to the tapered bore of the machine element, abutment means on said outer sleeve for engaging the machine element and positioning the same at a fixed axial position relative to the outer sleeve, the outer sleeve having a circumferential interlock means providing a forward radial surface; and (c) a nut having interior threads and a circumferential interlock means having a forward drive surface such that upon rotation of the nut the interior threads of the nut engage with the external threads of the inner sleeve effecting axial displacement of the inner sleeve in one direction relative to the nut and the forward drive surface of the nut engages with the forward radial surface of the outer sleeve effecting axial displacement of the outer sleeve in an opposite direction, the displacements causing the interior bore of the inner sleeve to contract against the shaft and the tapered external surface of the outer sleeve to expand against the tapered bore of the machine element while it is in said fixed axial position.

9. The device according to claim 8 wherein the outer sleeve comprises three segments, each of which embraces approximately one-third of the circumference of the inner sleeve, the device including a component surrounding the segments.

10. The device according to claim 8 wherein the abutment means comprise a circumferential external flange located at the small end of the tapered external surface of the outer sleeve.

11. The device according to claim 8 wherein the outer sleeve comprises a circumferential external flange proximate the circumferential interlock means cooperating with the tapered external surface of the outer sleeve to provide a seat or saddle for maintaining the machine element at a fixed position relative to the outer sleeve.

12. The device according to claim 8 wherein the circumferential interlocking means of the outer sleeve comprises a rearward radial surface and the circumferential locking means of the nut comprises a rearward drive surface so that upon opposite rotation of the nut the rearward drive surface of the nut engages with the rearward radial surface of the outer sleeve causing the interior bore of the inner sleeve to expand away from the cylindrical shaft and the tapered external surface of the outer sleeve to contract away from the tapered bore of the machine element.

13. The device according to claim 8 wherein the interlock means of the outer sleeve comprises a circumferential groove in the exterior surface of the outer sleeve and the interlock means of the nut comprises a circumferential flange in the interior surface of the nut for engagement with the circumferential groove of the outer sleeve.

14. The device according to claim 8 wherein the angle of the taper of the external surface of the inner sleeve is equal to the angle of taper of the internal surface of the outer sleeve and is selected relative to the length of the threaded portion of the inner sleeve to afford contraction of the outer sleeve segments sufficient to enable the larger end of the outer sleeve to pass through the small end of the tapered bore of the machine element.

15. A device for coaxially mounting a machine element having a tapered bore upon a cylindrical shaft comprising:

(a) an inner sleeve for encircling the cylindrical shaft, the inner sleeve having a tapered external surface and an interior bore corresponding in diameter to the cylindrical shaft, the inner sleeve having a plurality of segments for providing a plurality of terminated axial slots extending longitudinally from one end and terminating short of the other end of the inner sleeve and an axial slot extending longitudinally from one end to the other end of the inner sleeve to permit contraction of the interior bore, the inner sleeve also having external threads at one end of the inner sleeve;

(b) an outer sleeve for encircling the inner sleeve comprising three segments, each of which embraces approximately one-third of the circumference of the inner sleeve, the outer sleeve having a tapered internal surface corresponding in angle of taper to the tapered external surface of the inner sleeve and a tapered cylindrical external surface corresponding in diameter to the tapered bore of the machine element, the outer sleeve having a circumferential groove in the exterior surface of the outer sleeve, the outer sleeve also having a circumferential external flange at the small end of its tapered external surface for maintaining the machine element at a fixed position relative to the outer sleeve; and (c) a nut having interior threads for engagement with the external threads of the inner sleeve and a circumferential flange in the interior surface of the nut for engagement with the circumferential groove of the outer sleeve, such that upon rotation of the nut the interior threads of the nut engage with the external threads of the inner sleeve effecting axial displacement of the inner sleeve in one direction and the flange of the nut engages with the groove of the outer sleeve effecting axial displacement of the outer sleeve in an opposite direction, the displacements causing the interior bore of the inner sleeve to contract against the cylindrical shaft and the tapered cylindrical external surface of the outer sleeve to expand against the tapered bore of the machine element.

16. In combination with a machine element having a tapered bore, said element being selected from a group consisting of pulleys and gears, and a cylindrical shaft positioned coaxially within said tapered bore, a device consisting essentially of:

(a) an inner sleeve for encircling the shaft, the inner sleeve having a tapered external surface corresponding to the tapered bore of a machine element and an interior bore corresponding in diameter to the shaft, the inner sleeve having a plurality of segments for providing a plurality of terminated axial slots extending longitudinally from one end and terminating short of the other end of the inner sleeve and an axial slot extending longitudinally from one end to the other end of the inner sleeve to permit contraction of the interior bore, the inner sleeve also having external threads at one end of the inner sleeve;

(b) an outer sleeve for encircling the inner sleeve comprising a plurality of segments, the outer sleeve having a tapered internal surface corresponding in angle of taper to the tapered external surface of the inner sleeve and a tapered external surface corresponding to the tapered bore of the machine element, the outer sleeve having a circumferential interlock means providing a forward radial surface and a circumferential external flange at the small end of its tapered external surface for maintaining the machine element at a fixed axial position relative to said outer sleeve; and (c) a nut having interior threads and a circumferential interlock means having a forward drive surface such that upon rotation of the nut the interior threads of the nut engage with the external threads of the inner sleeve effecting axial displacement of the inner sleeve in one direction relative to the nut and the forward drive surface of the nut engages with the forward radial surface of the outer sleeve effecting axial displacement of the outer sleeve in an opposite direction, the displacements causing the interior bore of the inner sleeve to contract against the shaft and the tapered external surface of the outer sleeve to expand against the tapered bore of the machine element.

* * * * *